(12) United States Patent
Javidi et al.

(10) Patent No.: US 8,150,100 B2
(45) Date of Patent: Apr. 3, 2012

(54) SYSTEM AND METHOD FOR RECOGNITION OF A THREE-DIMENSIONAL TARGET

(75) Inventors: Bahram Javidi, Storrs, CT (US); Seokwon Yeom, Seoul (KR); Edward Alan Watson, Kettering, OH (US)

(73) Assignees: University of Connecticut, Center for Science and Technology Commercialization, Farmington, CT (US); The United States of America as represented by the Secretary of the Air Force, Washington, DC (US); The University of Connecticut, Farmington, CT (US)

( * ) Notice: Subject to any disclaimer, the term of this patent is extended or adjusted under 35 U.S.C. 154(b) by 1085 days.

(21) Appl. No.: 11/938,434

(22) Filed: Nov. 12, 2007

(65) Prior Publication Data

US 2010/0278383 A1   Nov. 4, 2010

Related U.S. Application Data

(60) Provisional application No. 60/858,733, filed on Nov. 13, 2006.

(51) Int. Cl.
*G06K 9/00* (2006.01)

(52) U.S. Cl. .................... 382/103; 348/222.1

(58) Field of Classification Search .................. 382/103; 348/222.1
See application file for complete search history.

(56) References Cited

U.S. PATENT DOCUMENTS

| 6,399,953 | B1 * | 6/2002 | Kitamura ............. 250/491.1 |
| 7,818,130 | B2 * | 10/2010 | Sipe et al. ............... 702/19 |
| 2009/0160985 | A1 * | 6/2009 | Javidi et al. ............. 348/294 |

OTHER PUBLICATIONS

Yeom et al., "Three-dimensional distortion-tolerant object recognition using integral imaging", Nov. 2004, Optics Express, vol. 12, No. 23, 5795-5809.*
Javidi et al., "Photon counting three-dimensional passive sensing and object recognition", 2006, Proc. of SPIE vol. 6201.*
Yeom et al., "Three-dimensional object feature extraction and classification with computational holographic imaging", Applied Optics, Jan. 2004, vol. 43, No. 2, 442-451.*

* cited by examiner

*Primary Examiner* — Jason M Repko
*Assistant Examiner* — Katrina Fujita
(74) *Attorney, Agent, or Firm* — Cantor Colburn LLP

(57) ABSTRACT

A system for recognition of a target three-dimensional object is disclosed. The system may include a photon-counting detector and a three-dimensional integral imaging system. The three-dimensional integral imaging system may be positioned between the photon-counting detector and the target three-dimensional object.

18 Claims, 19 Drawing Sheets

Auto correlation and cross correlation with reference car 1

Auto correlation and cross correlation with reference car 1

ROC curve (reference: car 1, false object: car 2)

ROC curve (reference: car 1, false object: car 3)

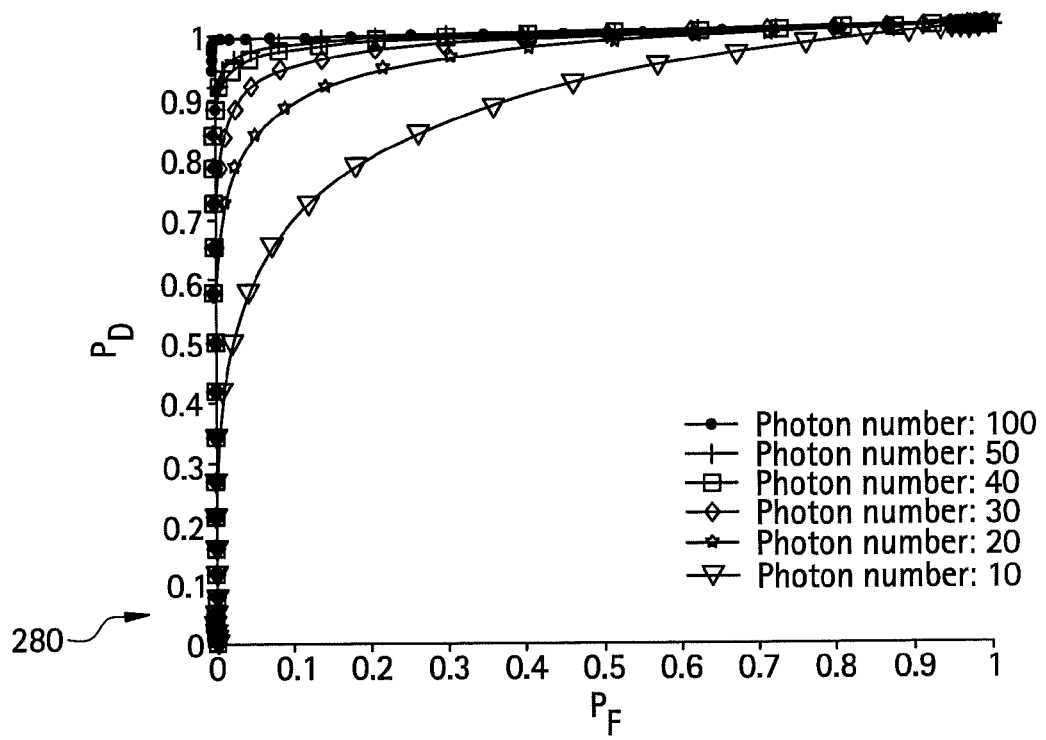

ROC curve (reference: car 1, false object: car 2)

ROC curve (reference: car 1, false object: car 3)

SYSTEM AND METHOD FOR RECOGNITION OF A THREE-DIMENSIONAL TARGET

CROSS REFERENCE TO RELATED APPLICATION

This application claims priority to U.S. Provisional Application No. 60/858,733 filed Nov. 13, 2006, the entire contents of which are incorporated herein by reference.

STATEMENT OF GOVERNMENT SUPPORT

The present invention was developed in part by a scientist at the U.S. Air Force Research Laboratories at Wright Patterson Air Force Base. The United States Government has certain rights in this invention.

FIELD OF THE INVENTION

At least an embodiment of the present invention may relate to the fields of three-dimensional image processing, photon counting, pattern recognition systems, and passive sensing.

BACKGROUND OF THE INVENTION

Automatic target recognition (ATR), which is the ability of a machine to detect and identify objects in a scene and categorizing them into a class, has been the subject of intense research. ATR systems need to deal with uncooperative objects in complex scenes. Statistical fluctuations of the scene and the objects caused by noise, clutter, distortion, rotation, and scaling changes create many challenges toward achieving a reliable ATR system. Numerous techniques using two-dimensional (2D) image processing have been developed while in recent years there has been growing research interest in three-dimensional (3D) object recognition to enhance discrimination capability of unlabeled objects. Additional benefits of 3D imaging include the ability to segment the object of interest from the background and to change the point of view of the observer with respect to the image. Many 3D imaging techniques involve some form of active illumination; the waveform that is transmitted is used to derive the range dimension of the image. However, for imaging applications in which cost and covertness are important, the use of an illumination source may not be feasible.

Photon counting imaging has been applied in many fields such as night vision, laser radar imaging, radiological imaging, and stellar imaging. Advances in the field have produced sensitive receivers that can detect single photons. Devices with high gain produce large charge packet upon absorption of a single incident photon. The number of carriers in charge packet is ignored and only location of the charge packet is recorded.

Therefore, imagery is built up a photo-count at a time, and 2D imagery (irradiance) is developed over time. These highly sensitive receivers allow decrease in required transmitted power over conventional imaging sensors, and trade power for integration time. 2D image recognition using photon counting techniques have been demonstrated. Photon counting techniques have been applied to infrared imaging and thermal imaging. Photon counting detectors have been considered for 3D active sensing by LADAR.

Integral imaging is a sensing and display technique for 3D visualization. An integral imaging system consists of two stages. In the pickup (sensing) stage, an array of microlenses generates a set of 2D elemental images that are captured by a detector array (image sensor). Each elemental image has a different perspective of the 3D object. Therefore, the image sensor records a set of projections of the object from different perspectives. In the reconstruction stage, the recorded 2D elemental images are projected through a similar micro-lens array to produce the original 3D scene. Integral imaging is a passive sensor and unlike holography or LADAR, it does not require active illumination of the scene under investigation. The application of integral imaging has been extended to object recognition and longitudinal distance estimation. The resolution of the 3D image reconstruction and the accuracy of depth estimation have been improved by a moving array lenslet technique. Additionally, statistical pattern recognition technique has been applied for distortion-tolerant 3D object recognition.

In conventional applications, integral imaging has been utilized for the sensing and recognition of unknown targets. Such integral imaging systems have a disadvantage in that they require a large number of photons.

Despite these advances, there is a continuing need in the field for a 3D photon-counting integral imaging system that requires reduced system power and reduced computational time, as well as a need for novel signal processing algorithms that are more efficient than conventional systems in terms of capability for target discrimination.

SUMMARY OF THE INVENTION

In at least one embodiment of the present invention, a system for recognition of a target three-dimensional object may include a photon-counting detector and a three-dimensional integral imaging system. The three-dimensional integral imaging system may be positioned between the photon-counting detector and the target three-dimensional object.

In at least an embodiment of the invention, the number of photons required is reduced significantly to as few as 50 photons. As a result, the present invention provides high power efficiency and low computational complexity.

At least one embodiment of the present invention provides an advantage of significantly reducing the required number of photons for target recognition. For example, the present system requires fewer than 100 photons to detect and recognize unknown targets. The conventional systems known in the existing art need to record a whole two-dimensional irradiance image composed of 1000×1000 pixels. The small number of photons required by the present invention results in significant reduction of the system power requirements and also results in significant reduction in computational load. For example, processing of 50-100 pixels according to the present system instead of one million pixels, as on conventional systems, results in a much faster processing time.

At least one embodiment of the present invention may comprise integral imaging comprising three-dimensional information recording and three-dimensional information display by means of multi-perspective imaging. The multiple-perspective effects of the integral imaging of the present invention provide a distortion-tolerant system.

At least an embodiment the present invention may comprise a signal processing algorithm using nonlinear matched filtering and provides advantages over conventional matched filtering. Under the same target image conditions, for example, the required number of photons using an algorithm of the present invention is substantially less than the number of photons required by conventional signal processing algorithms.

At least an embodiment of the invention may provide a system for target or pattern recognition under conditions of low ambient light.

At least an embodiment of the invention provides an image recognition system with the advantage of high speed processing of the input images. Such a system provides advantages for application to medical image recognition, industrial image recognition, and recognition of targets for defense and security purposes.

At least an embodiment of the invention is described in the article "Photon counting passive 3D image sensing for automatic target recognition," authored by Seokwon Yeom, Bahram Javidi, and Edward Watson, and published in volume 13, no. 23 of Optics Express on Nov. 14, 2005, and the entire contents of this article are incorporated by reference.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 11(a) shows a graph receiver operating characteristic curves according to at least an embodiment of the invention.

DETAILED DESCRIPTION OF PREFERRED EMBODIMENTS

Figure 1:
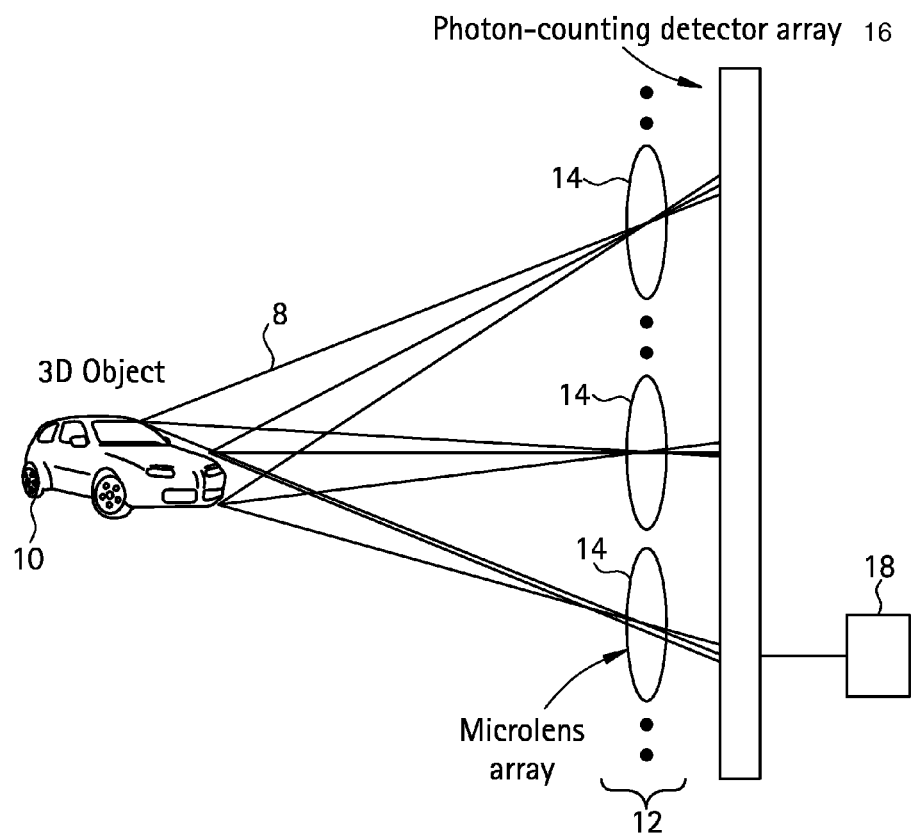
FIG. 1 is a schematic diagram of a system according to at least an embodiment of the invention.

Techniques based on integral imaging have been considered for 3D sensing and display. As illustrated in FIG. 1, a pinhole array or a microlens array 12 can be used to sense irradiance and directional information of rays 8 from 3D objects 10 during the pickup process. One advantage of integral imaging for 3D image recognition lies in its capability of multiple perspective imaging. The depth and perspective information in the multiple perspective imaging can be utilized to build a compact 3D recognition system. It is assumed that each microlens 14 in the microlens array 12 generates a photon-limited elemental image on photon-counting detector array 16. Multiple perspectives of photon-limited scenes are recorded according to the relative position and the field of view (FOV) of the microlens 14. Different perspective information of 3D object can be acquired by the photon counting integral imaging. The multi-view effect of integral imaging can be beneficial for the pattern recognition although it can degrade 3D visualization quality.

Additionally, FIG. 1 shows a signal analyzer 18 that is structured to perform signal analysis on the photon-limited images detected by photon-counting detector array 16. The details of the signal analysis are described below.

Reconstruction is the reverse of the pick-up process. It can be carried out optically and computationally from elemental images. In display, 3D images are foamed by the intersection of discrete rays coming from elemental images. The 3D scene of the pseudoscopic real image is formed by propagating the intensity of elemental images through the microlens array which is placed in front of the display device. The pseudoscopic real image is displayed by the rays from opposite directions but having the same intensities as in the sensing process. The 3D display of integral imaging provides autostereoscopic images with full parallax and continuously varying viewpoints. In the computational method, the reconstruction is processed numerically using a computer. Computational reconstruction has been researched with various techniques.

Given fairly standard assumptions, the probability of counting k photons in a time interval τ can be shown to be Poisson distributed. However, such a distribution assumes that the irradiance at the detector is perfectly uniform in time and space. In the case that the irradiance is not uniform, the statistics of the irradiance fluctuations must also be considered. However, it can be shown for many cases of interest (i.e. blackbody radiation in the visible, including blackbody radiation from sources as hot as the sun) that the fluctuations in irradiance are small compared to the fluctuations produced by the quantized nature of the radiation. Therefore, in this section the probability distribution is modeled as a Poisson distribution:

$$P_d(k; x, \tau) = \frac{[\alpha(x)\tau]^k e^{-\alpha(x)\tau}}{k!}, k = 0, 1, 2, \ldots, \quad (1)$$

where k is the number of counts produced by a detector centered on a position vector x during a time interval τ; and a(x) is a rate parameter. The rate parameter can be given by:

$$a = \frac{\eta E}{h\bar{v}}, \quad (2)$$

where η is the quantum efficiency of the detection process; E is the power incident on the detector; h is Plank's constant; and $\bar{v}$ is the mean frequency of the quasi-monochromatic light source. It is noted that the mean of photo-counts $n_p(x)$ is given by:

$$n_p(x) \equiv \langle k(x) \rangle = a(x)\tau = \frac{\eta E(x)}{h\overline{v}}\tau, \quad (3)$$

where $\langle \cdot \rangle$ stands for the expectation operator.

To simulate photon-limited images from an intensity image, it is assumed that the probability of detecting more than one photon in a pixel is zero. While this assumption does place restrictions on the allowed irradiance distribution in the image, it is anticipated that the image will contain very few photons, i.e. $n_p(x) \ll 1$.

It can be shown that the probability of detecting a photo-event at the ith pixel is given by the normalized irradiance image. Since the event location for each count is an independent random variable, the mean of photo-counts at the ith pixel is given by:

$$n_p(x_i) = \frac{N_p S(x_i)}{\sum_{j=1}^{N_T} S(x_j)}, \quad (4)$$

where $N_p$ is a predetermined number of counts in the entire scene; $S(x_i)$ is the irradiance of the input image at the pixel i; and $N_T$ is the total number of pixels. From Eq. (1), one can obtain the probability that no photon arrives at pixel I by:

$$P(0;x_i) = e^{-n_p(x_i)}. \quad (5)$$

According to the assumption above, the probability that only one photon is detected is:

$$P(1;x_i) = 1 - P(0;x_i) = 1 - e^{-n_p(x_i)}. \quad (6)$$

To simulate an image consisting of individual photo-counts, a random number [rand($x_i$)] is generated which is uniformly distributed between 0 and 1 at each pixel. If the random number is less than the probability that no photon arrives (see Eq. (5)), it is assumed that no photon is detected, otherwise, one photon is assumed to be detected:

$$\hat{S}(x_i) = \begin{cases} 0, & \text{If } rand(x_i) \le P(0;x_i) \\ 1, & \text{otherwise,} \end{cases} \quad (7)$$

where rand($x_i$) stands for the random number generated for pixel i.

If the image contains pixels whose irradiance is much larger than the mean image irradiance, then the above assumption may not be valid. In this case, $n_p(x)$ can be large enough so that the assumption $n_p(x) \ll 1$ is not valid even at the anticipated low-level of photons in the scene. In this case, the hypothesis could be revised to allow multiple photon detection per pixel.

As shown in Eq. (7), the photon counting is assumed to be a binary image:

$$\hat{S}(x_i) = b_i, i=1, \ldots, N_T, \quad (8)$$

where $b_i$ is a random number which follows Bernoulli distribution. The probability function of $b_i$ is:

$$P(b_i=1) = 1 - e^{-n_p(x_i)} \approx n_p(x_i), \quad (9)$$

$$P(b_i=0) = e^{-n_p(x_i)} \approx 1 - n_p(x_i), \quad (10)$$

since it is assumed that $n_p(x_i) \ll 1$. Therefore, from Eq. (8) and Eq. (4), one can derive:

$$\langle \hat{S}(x_i) \rangle \approx n_p(x_i), \quad (11)$$

and, $$\left\langle \sum_{i=1}^{N_T} \hat{S}(x_i) \right\rangle \approx \sum_{i=1}^{N_T} n_p(x_i) = N_p. \quad (12)$$

Equivalently, one realization of a photon-limited image can be described as:

$$\hat{S}(x_i) = \sum_{k=1}^{N} \delta(x_i - x_k), i=1, \ldots, N_T, \quad (13)$$

where N is the total number of photon detection events occurred in the scene; $\delta$ is a kronecker delta function; and $x_k$ represents the position of the pixel k where a photon detection event occurs. It is noted that N and $x_k$ are random numbers.

Matched filtering of photon-limited images estimates the correlation between the intensity images of a reference and an unknown input image obtained during the photon counting event. Matched filtering is defined as the nonlinear correlation normalized with the power v of the photon-limited image intensity as shown below:

$$C_{rs}(x_j;v) = \frac{\sum_{i=1}^{N_T} R(x_i + x_j)\hat{S}(x_i)}{\left(\sum_{i=1}^{N_T} R^2(x_i)\right)^{\frac{1}{2}} \left(\sum_{i=1}^{N_T} \hat{S}(x_i)\right)^v} = \frac{\sum_{k=1}^{N} R(x_k + x_j)}{A\left(\sum_{i=1}^{N_T} \hat{S}(x_i)\right)^v}, \quad (14)$$

$$A = \left(\sum_{i=1}^{N_T} R^2(x_i)\right)^{\frac{1}{2}}, \quad (15)$$

where N is the total number of photons detected; R is the radiance of the reference image from the object class r; and s represents an unknown input object from which the photon-limited image $\hat{S}$ is generated. The second term in Eq. (14) is derived by Eq. (13). Without loss of generality, it may be assumed that $R(x_i)$ and $S(x_i)$ are normalized:

$$\sum_{i=1}^{N_T} R(x_i) = \sum_{i=1}^{N_T} S(x_i) = 1. \quad (16)$$

It is noted that $C_{rs}(x_j;v)$ has the maximum value at $x_j=0$ in our experiments:

$$C_{rs}(0;v) = \max_{x_j} C_{rs}(x_j, v). \quad (17)$$

One advantage of photon counting detection is that the computational time of the matched filtering is much faster than conventional image correlation. As shown in the second term in Eq. (14) the correlation becomes merely the sum of the reference radiance at particular pixels (photon arrivals).

The following statistical properties of $C_{rs}(0;0)$ are proven in Appendix A:

$$\langle C_{rs}(0;0)\rangle \approx \frac{N_P}{A}\sum_{i=1}^{N_T} R(x_i)S(x_i), \quad (18)$$

$$\text{var}(C_{rs}(0;0)) \approx \frac{N_P}{A^2}\sum_{i=1}^{N_T}\{R^2(x_i)S(x_i)[1-N_P S(x_i)]\}, \quad (19)$$

where "var" stands for the variance.

The statistical properties of nonlinear correlation peak $C_{rs}(0;1)$ (see Eq. (14)) are proven in Appendix B:

$$\langle C_{rs}(0;1)\rangle \approx \frac{1}{A}\sum_{i=1}^{N_T} R(x_i)S(x_i), \quad (20)$$

$$\text{var}(C_{rs}(0;1)) \approx \frac{1}{A^2}\left(\frac{1}{N_p}\sum_{i=1}^{N_T} R^2(x_i)S(x_i) - \sum_{i=1}^{N_T} R^2(x_i)S^2(x_i)\right). \quad (21)$$

The nonlinear matched filtering shows different behaviors according to v. When v=0, both the mean (Eq. (18)) and variance (Eq. (19)) of the correlation peak $C_{rs}(0;0)$ are approximately proportional to $N_P$ since the second term including $N_P$ in Eq. (19) affects very minimally. However, the mean of $C_{rs}(0;1)$ (Eq. (20)) does not depend on the number of photons, i.e., the same correlation value can be theoretically achieved with any small number of photons. Although the variance of $C_{rs}(0;1)$ (Eq. (21)) increases when using lower number of photons, this property of photon-limited images might be beneficial for pattern recognition applications. A number of filtering algorithms may be used for automatic target recognition (ATR) of photon-limited images including a variety of nonlinear filters.

Discrimination ratio (DR) and Fisher ratio (FR) are defined as the performance metrics and are given by:

$$DR(r,s) \equiv \frac{m_{rr}}{m_{rs}}, \quad (22)$$

$$FR(r,s) \equiv \frac{[m_{rr}-m_{rs}]^2}{\sigma_{rr}^2+\sigma_{rs}^2}, \quad (23)$$

where $m_{rs}$ and $\sigma_{rs}$ are the sample mean and the sample standard deviation of $C_{rs}(0;v)$, respectively, which are suitable estimates for the mean and the variance. Receiver operating characteristic (ROC) curves are also illustrated in the experimental results to investigate the discrimination capability of the proposed system.

Figure 2A:
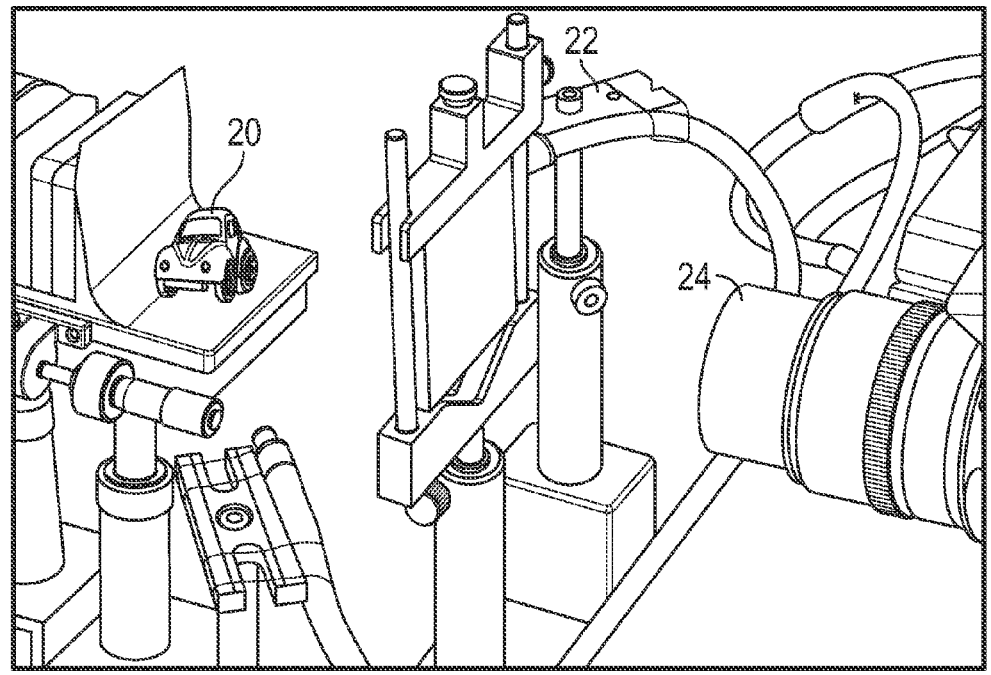
FIG. 2(a) is a photograph showing an experimental setup according to at least an embodiment of the invention.

The results of simulations derived from experimentally produced integral images for a number of 3D objects are presented. The experimental system is composed of a microlens array 22 and a pick-up camera 24 as shown in FIG. 2(a). The pitch of each microlens is 1.09 mm and the focal length of each microlens is about 3 mm. The focal length and the f-number of the mount lens in the pick-up camera are 50 mm and 2.5, respectively.

Figure 2B:
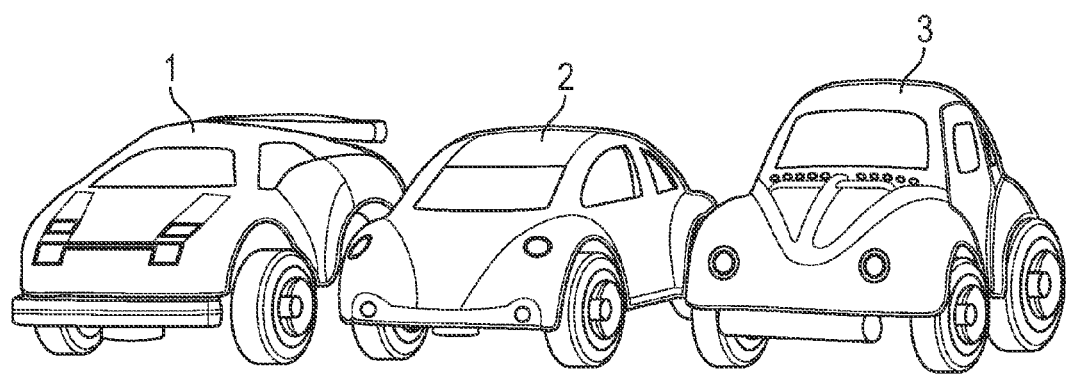
FIG. 2(b) is a photograph showing the targets used the experimental setup.

Three types of toy cars 1, 2, and 3 are used as target 20 in the experiments as shown in FIGS. 2(a) and 2(b). Each car is about 4.5 cm×2.5 cm×2.5 cm. The distance between the lens of pick-up camera 24 and the microlens array 22 is 11.5 cm, and the distance between the microlens array 22 and the target 20 is 7.5 cm.

Figure 3A:
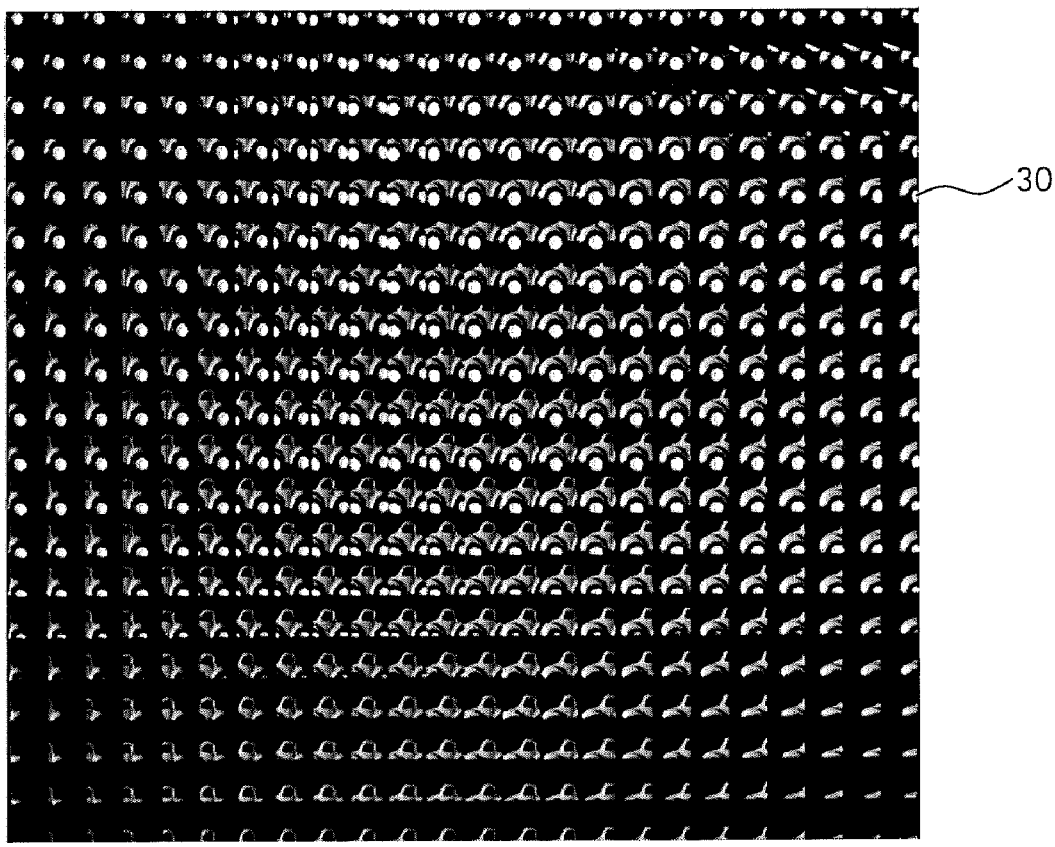
FIG. 3(a) is an elemental image of a target according to at least an embodiment of the invention.
Figure 3B:
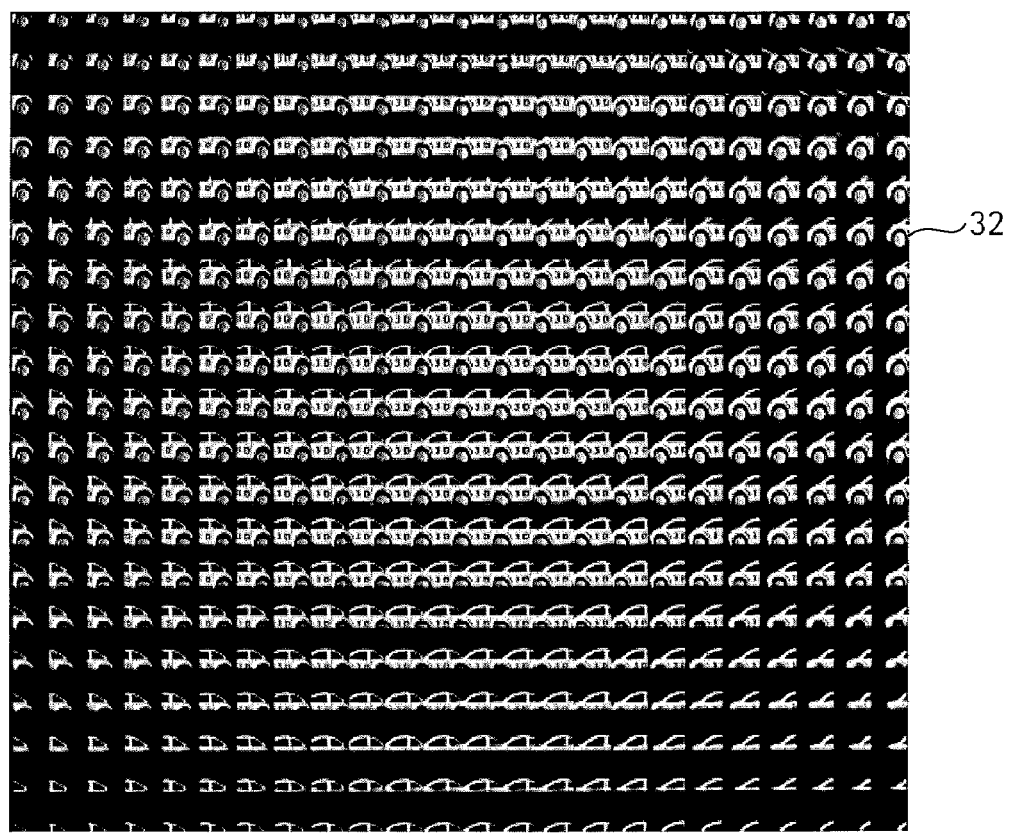
FIG. 3(b) is an elemental image of a target according to at least an embodiment of the invention.
Figure 3C:
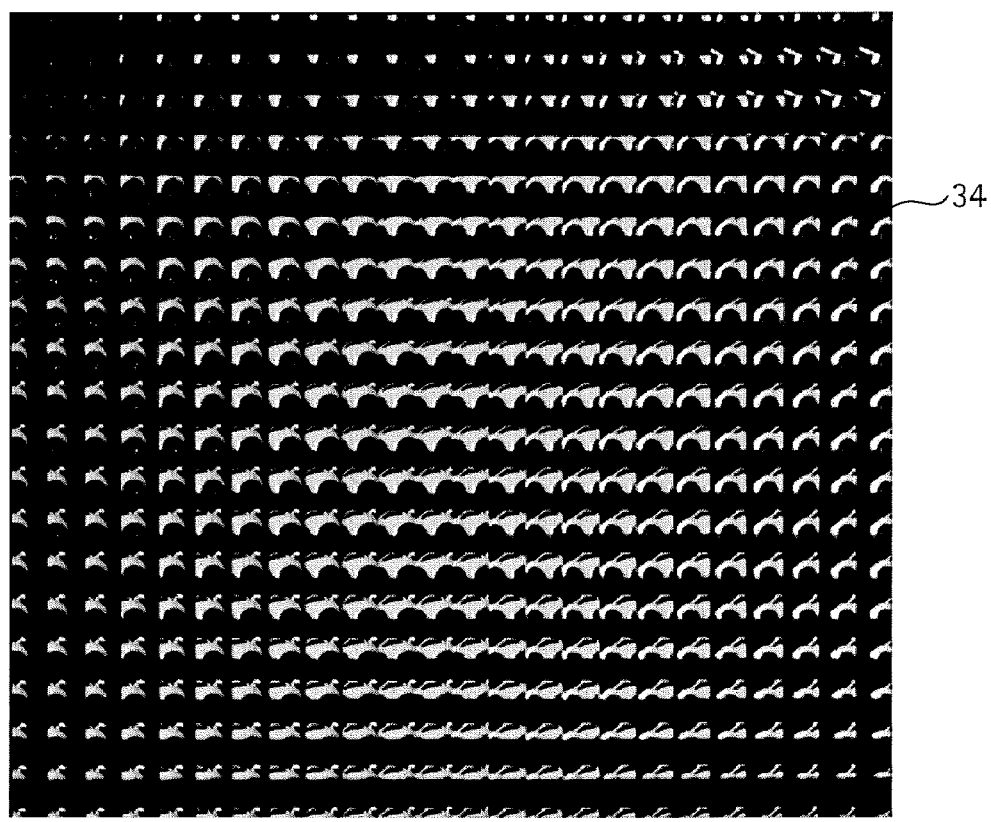
FIG. 3(c) is an elemental image of a target according to at least an embodiment of the invention.

A set of 20×24 elemental images is captured at one exposure. One set of elemental images for one object is composed of 1334×1600 pixels and the size of one elemental image is approximately 67×67 pixels. Sets of elemental images 30, 32, 34 are shown in FIGS. 3(a)-3(c). Elemental image 30 corresponds to car 1, elemental image 32 corresponds to car 2, and elemental image 34 corresponds to car 3. The intensity image of the reference (r) or the unlabeled input (s) corresponds to one set of elemental images captured during the pick-up process.

Photon-limited images are simulated using the irradiance of the elemental images to calculate $n_p(x_i)$ from Eq. (4). Equations (5) and (7) are then used to generate the photon-limited images. Several values of $N_P$, i.e, the mean number of photo-counts in the entire image, are used to test the proposed image recognition.

Figure 4:
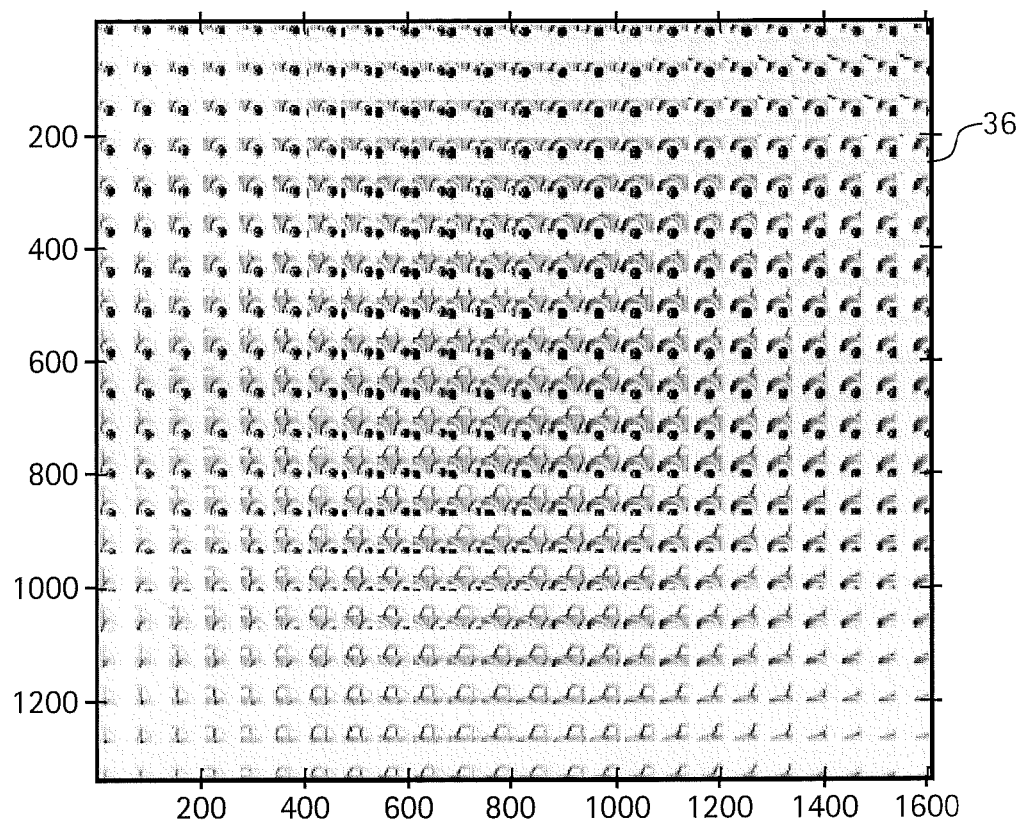
FIG. 4 is a probability map that no photon occurs based on the elemental mage of FIG. 3(a).
Figure 5A:
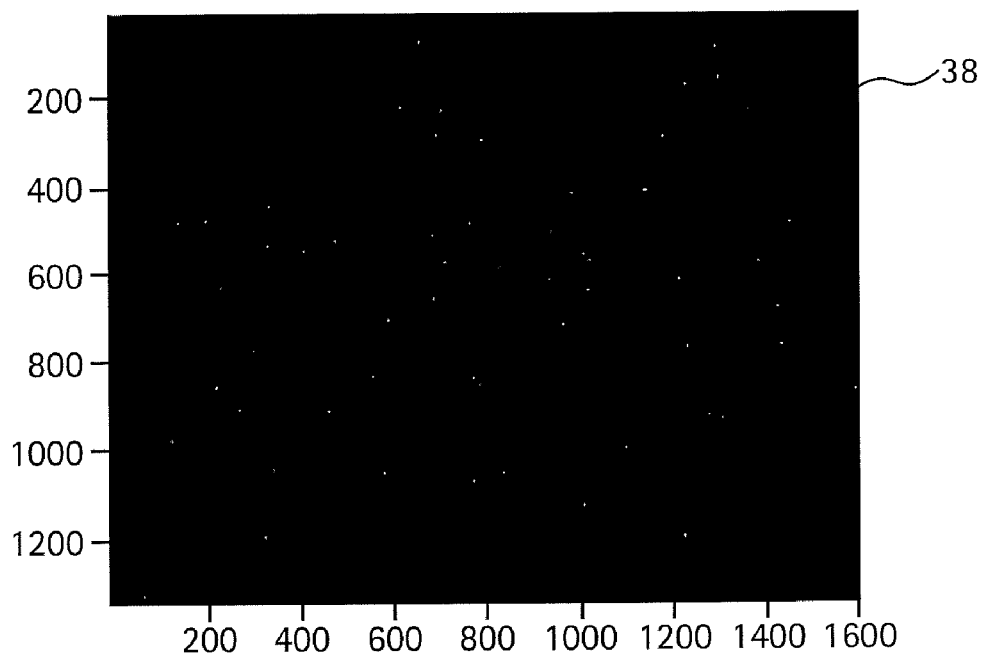
FIG. 5(a) is an example of a photon-limited image according to at least an embodiment of the invention.
Figure 5B:
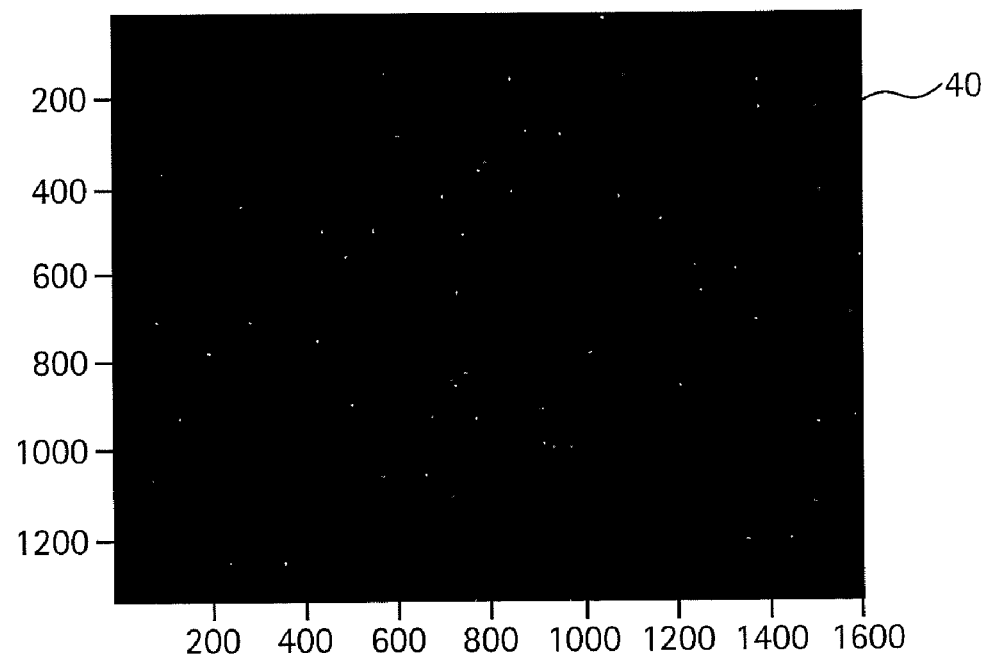
FIG. 5(b) is an example of a photon-limited image according to at least an embodiment of the invention.
Figure 5C:
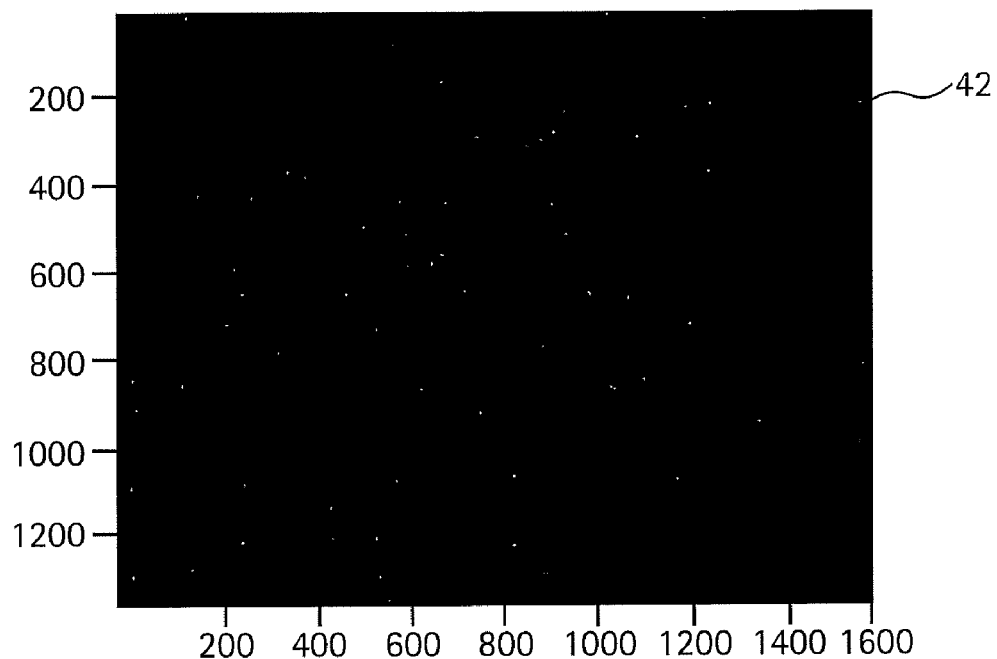
FIG. 5(c) is an example of a photon-limited image according to at least an embodiment of the invention.
Figure 6A:
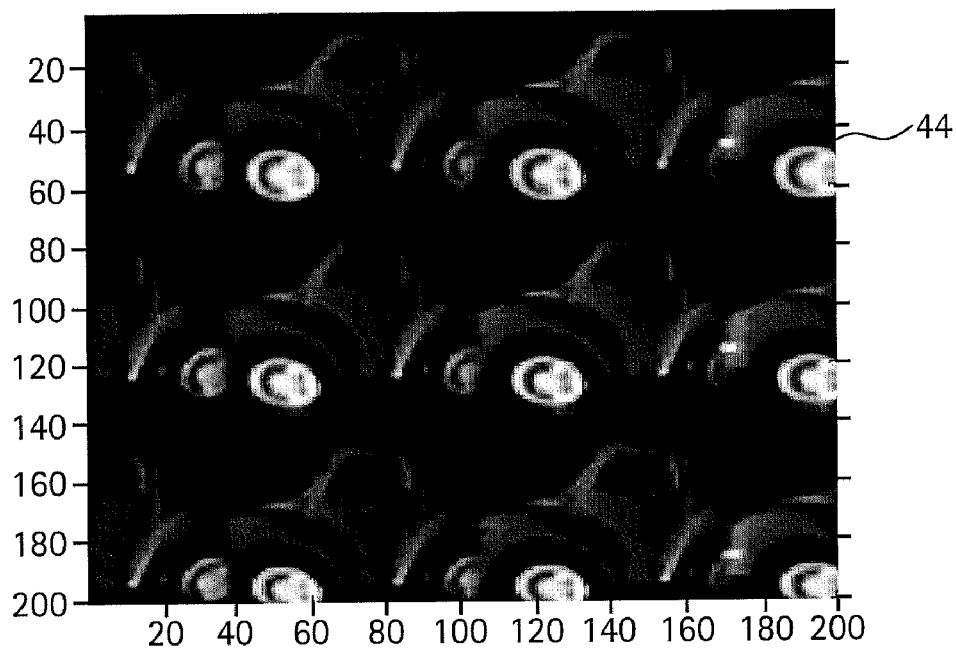
FIG. 6(a) is a magnified view of the elemental image of FIG. 3(a).
Figure 6B:
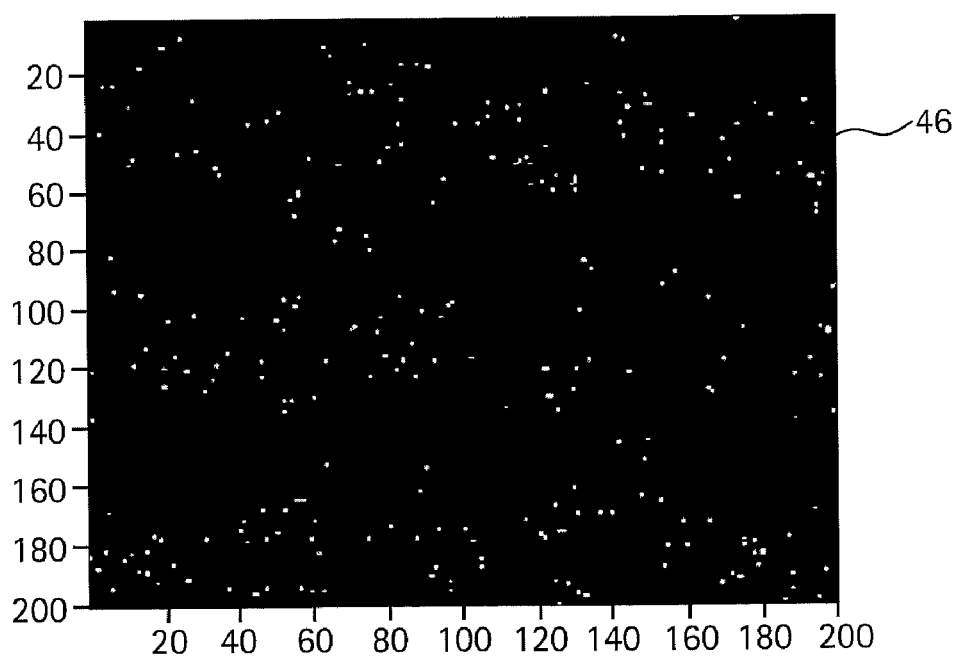
FIG. 6(b) is a magnified view of a photon-limited image.
Figure 6C:
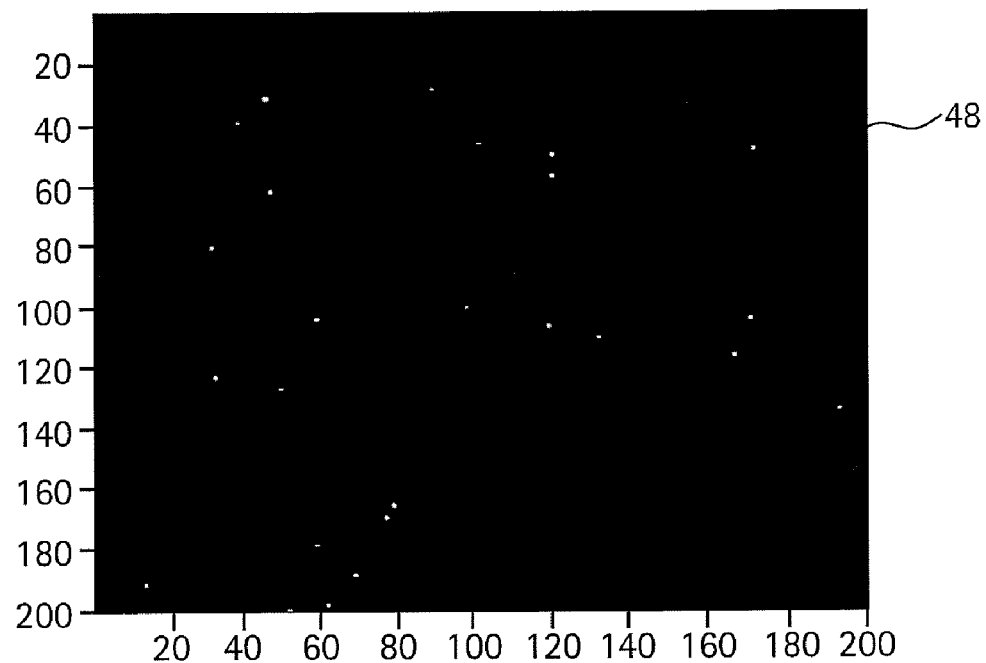
FIG. 6(c) is a magnified view of a photon-limited image.

FIG. 4 shows the probability map 36 that no photon arrives on the detector (Eq. (5)) for car 1 when $N_P$=1,000. FIGS. 5(a)-5(c) shows photon-limited images 38, 40, 42 generated for cars 1, 2, 3 respectively (FIGS. 3(a)-(c)) when $N_P$=1,000. FIG. 6(a) shows magnified elemental images 44 for car 1 (FIG. 3(a)) in the center and FIGS. 6(b) and 6(c) show magnified photon-limited elemental images 46, 48 corresponding to FIG. 6(a) when $N_P$=10,000 (FIGS. 6(b)) and 1,000 (FIG. 6(c)). The numbers of photons shown in FIGS. 6(b) and 6(c) are 272 and 25, respectively.

Photon-limited images are generated, each with a random number of photons. To compute the statistical means and variances, 1000 images are generated for each car. The mean value photon numbers are varied from 10 to 1,000. The intensity image of car 1 (FIG. 3(a)) is used as a reference image.

Figure 7A:
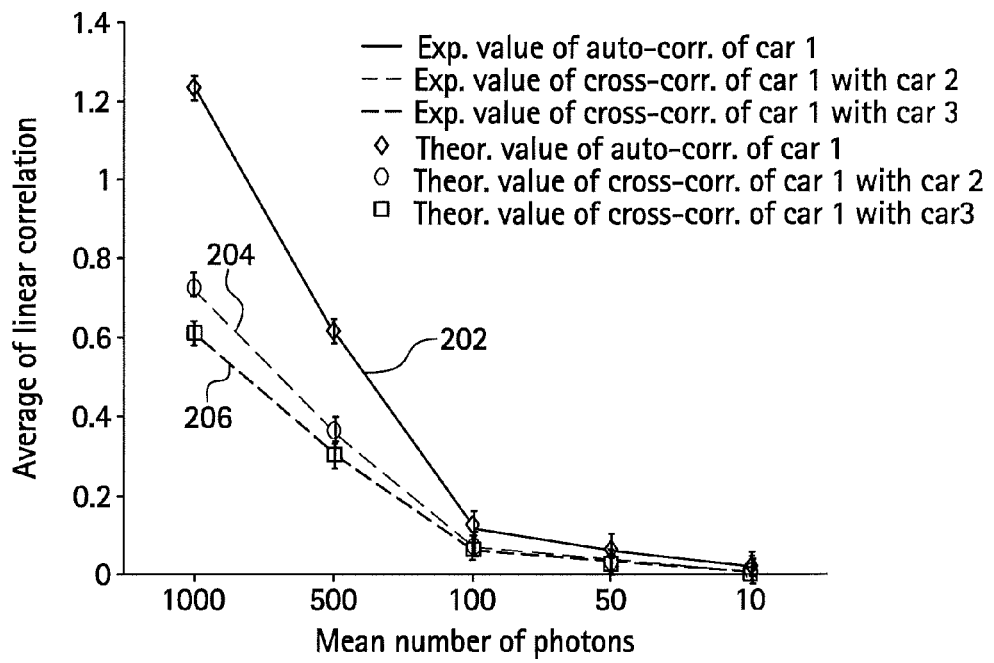
FIG. 7(a) shows a graph of the mean correlation.
Figure 7B:
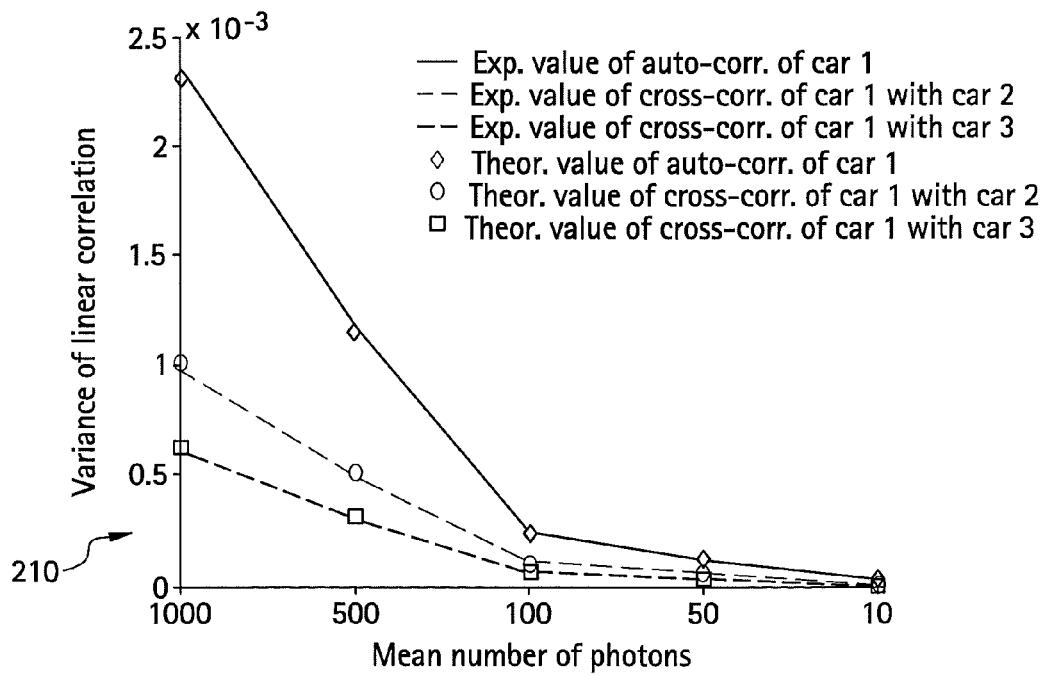
FIG. 7(b) shows a graph of the variation of correlation.

FIG. 7(a) shows the experimental results (sample mean) of correlation coefficients and their fluctuations (error bars) when v=0 with theoretical prediction in Eq. (18). Error bars stand for $m_{rs}\pm\sigma_{rs}$. Curve 202 represents the sample mean of autocorrelation between the intensity image and photon-limited images of car 1, and curve 204 represents the sample mean of cross-correlation between the intensity image of car 1 and photon-limited images of car 2, and curve 206 is the sample mean of cross-correlation between the intensity image of car 1 and photon-limited images of car 3. FIG. 7(b) is a graph 210 showing the sample variance of $C_{rs}(0;0)$ with theoretical prediction in Eq. (19).

Figure 8A:
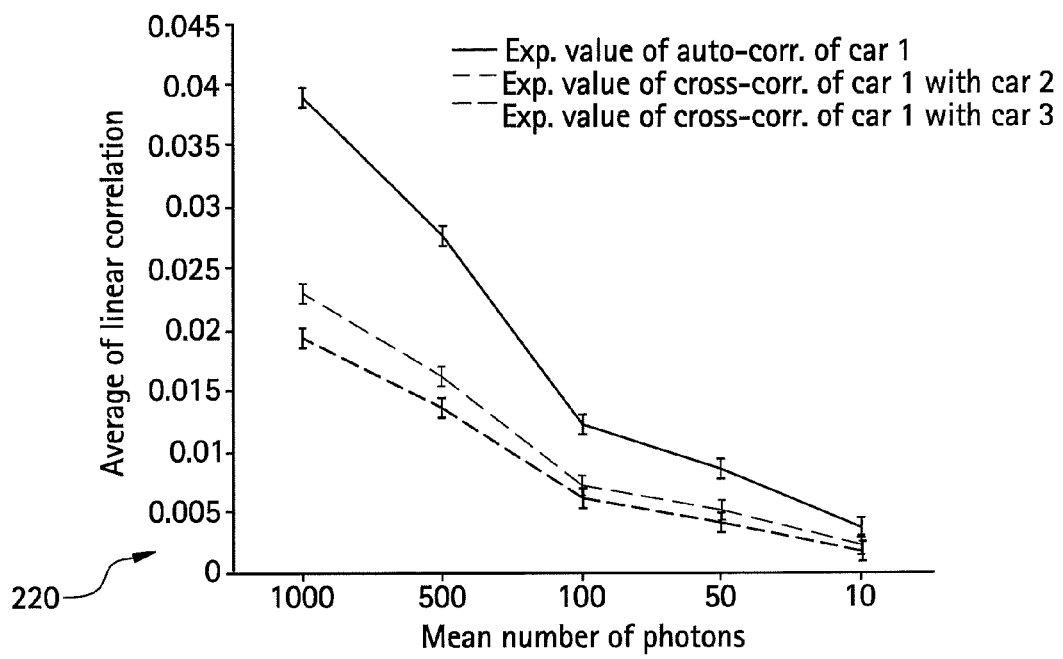
FIG. 8(a) shows a graph of the mean correlation.
Figure 8B:
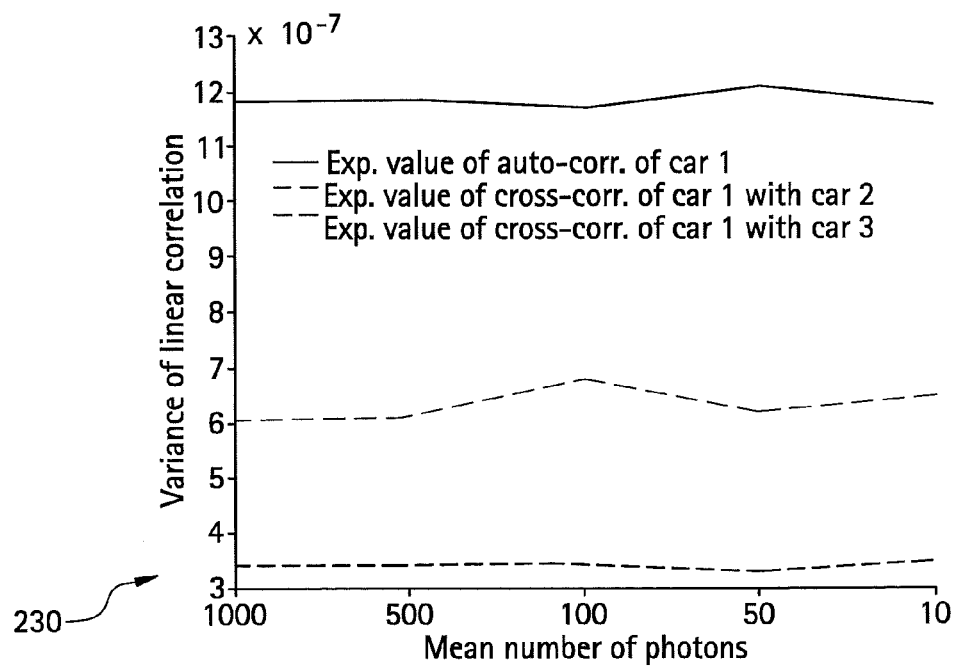
FIG. 8(b) shows a graph of the variation of correlation.
Figure 9A:
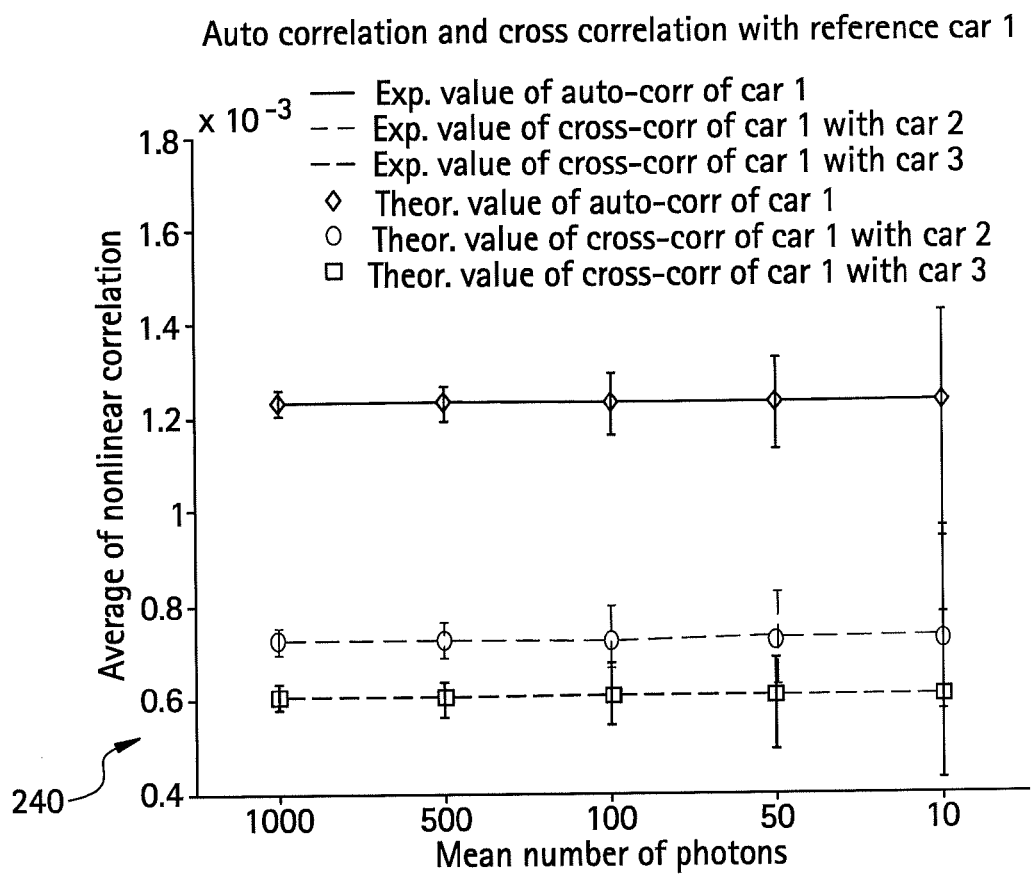
FIG. 9(a) shows a graph of the mean correlation.
Figure 9B:
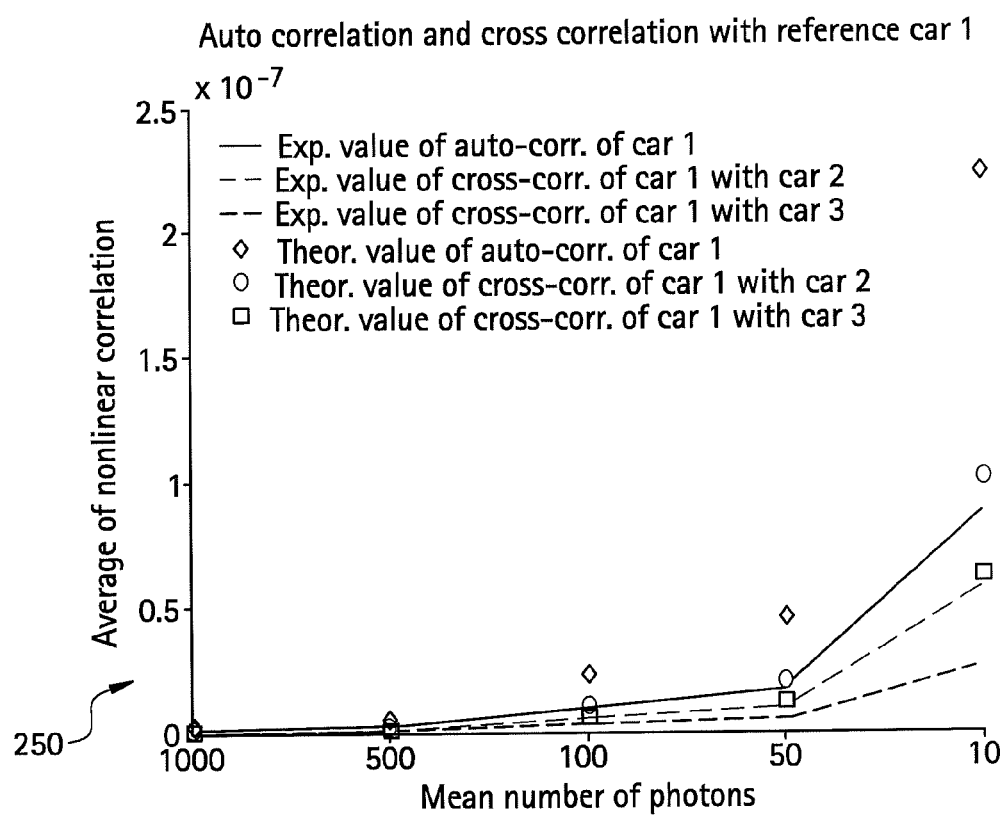
FIG. 9(b) shows a graph of the variation of correlation.
Figure 10A:
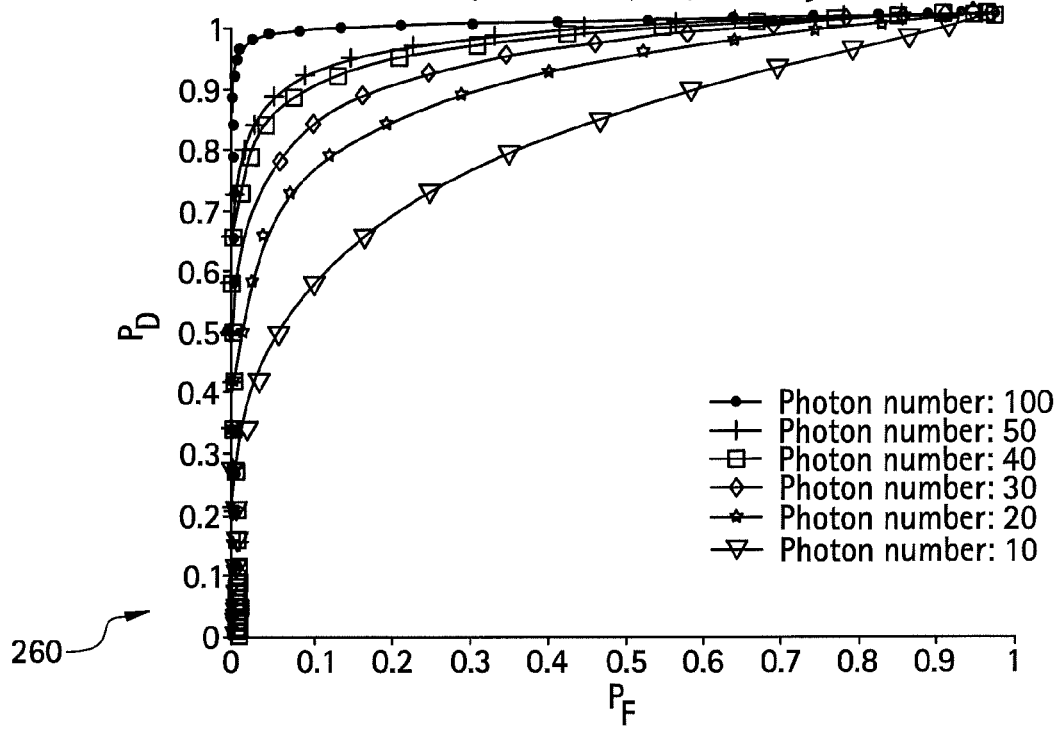
FIG. 10(a) shows a graph receiver operating characteristic curves according to at least an embodiment of the invention.
Figure 10B:
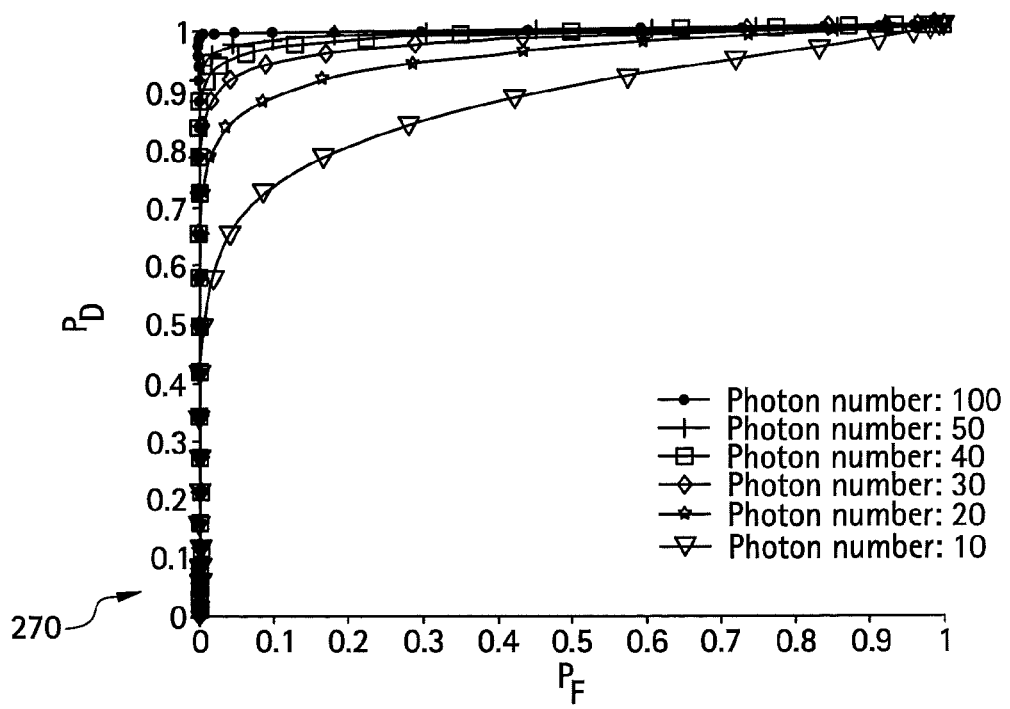
FIG. 10(b) shows a graph receiver operating characteristic curves according to at least an embodiment of the invention.
Figure 11B:
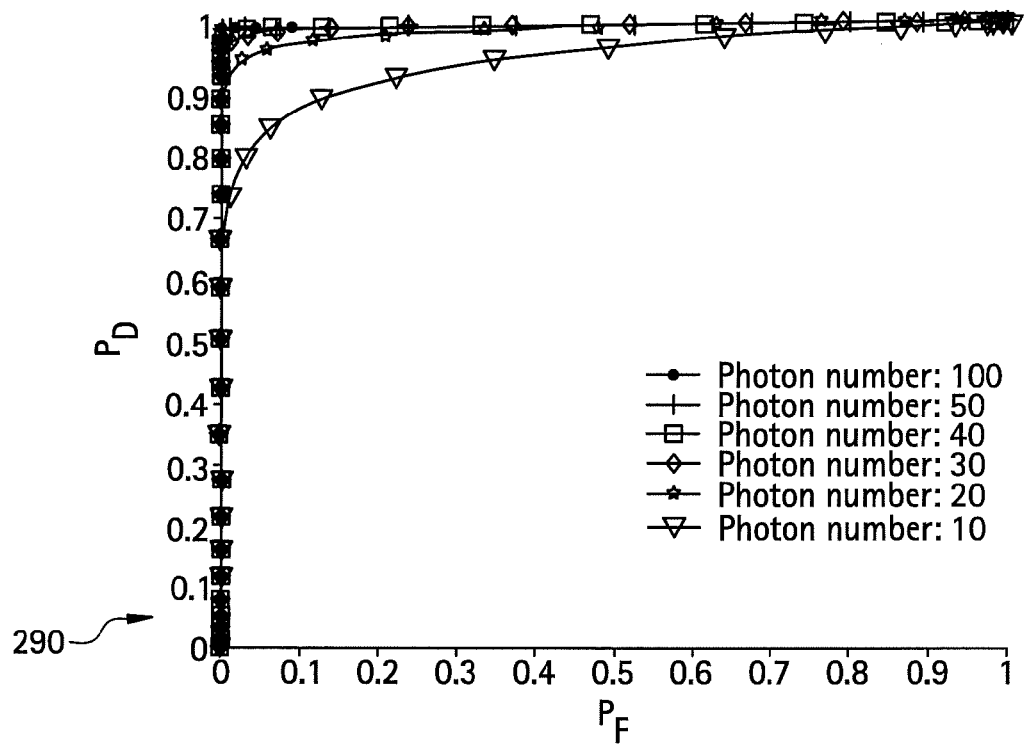
FIG. 11(b) shows a graph receiver operating characteristic curves according to at least an embodiment of the invention.
Figure 12A:
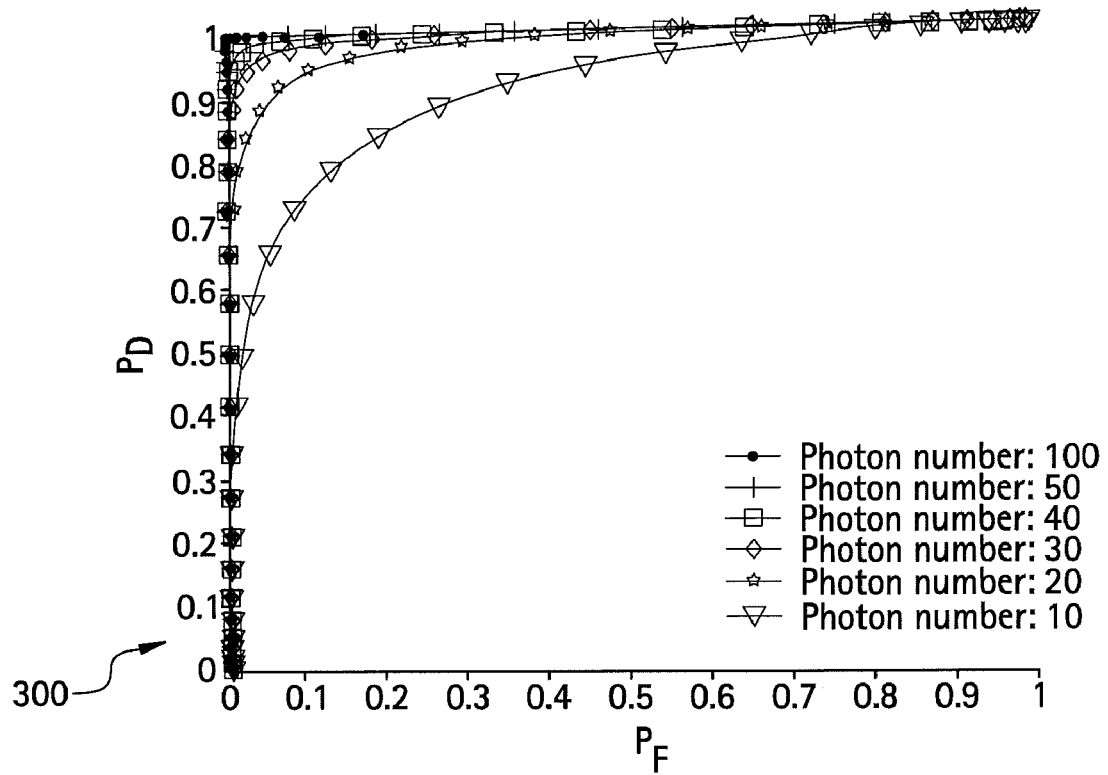
FIG. 12(a) shows a graph receiver operating characteristic curves according to at least an embodiment of the invention.
Figure 12B:
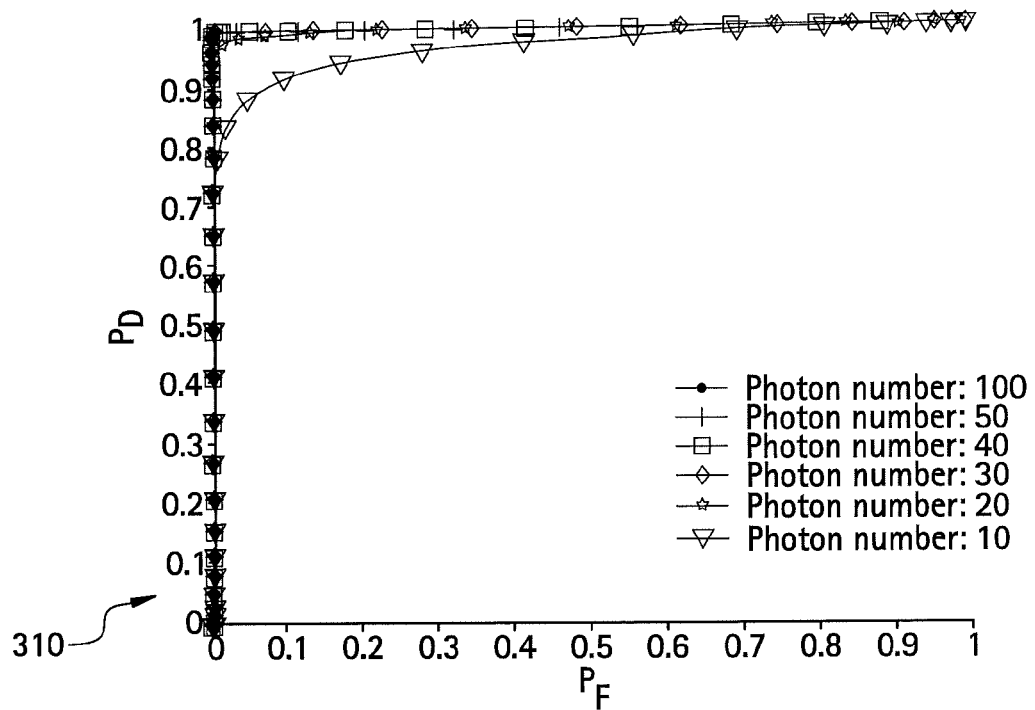
FIG. 12(b) shows a graph receiver operating characteristic curves according to at least an embodiment of the invention.

FIGS. 8(a) and 8(b) are graphs 220, 230 showing the sample mean and the sample variance of $C_{rs}(0;0.5)$, respectively. FIGS. 9(a) and 9(b) are graphs 240, 250 showing, respectively, the sample mean and the sample variance of $C_{rs}(0;1)$ with the theoretical values in Eq. (20) and (21). As shown in FIG. 7 and FIG. 9(a), theoretical values are presented to be very close to the experimental results. FIG. 9(b) shows the approximated theoretical value of the variance. The deviation from the theoretical prediction becomes larger as the number of photons decreases as shown in FIG. 9(b).

TABLE 1

Discrimination ratios.

|  |  | $N_P$ | | | | |
|---|---|---|---|---|---|---|
|  |  | 1,000 | 500 | 100 | 50 | 10 |
| v = 0 | DR(1, 2) | 1.7001 | 1.7031 | 1.6945 | 1.6678 | 1.6872 |
|  | DR(1, 3) | 2.0247 | 2.0290 | 2.0028 | 2.0097 | 2.0238 |
| v = 0.5 | DR(1, 2) | 1.6994 | 1.7014 | 1.7010 | 1.6713 | 1.6866 |
|  | DR(1, 3) | 2.026 | 2.0276 | 2.0103 | 2.0150 | 2.0238 |
| v = 1 | DR(1, 2) | 1.6987 | 1.6997 | 1.7073 | 1.6744 | 1.6867 |
|  | DR(1, 3) | 2.0272 | 2.0262 | 2.0174 | 2.0195 | 2.0224 |

TABLE 2

Fisher ratios.

|  |  | $N_P$ | | | | |
|---|---|---|---|---|---|---|
|  |  | 1000 | 500 | 100 | 50 | 10 |
| v = 0 | FR(1, 2) | 77.41 | 38.63 | 7.53 | 3.59 | 0.76 |
|  | FR(1, 3) | 131.04 | 66.05 | 12.98 | 6.46 | 1.33 |
| v = 0.5 | FR(1, 2) | 144.16 | 72.03 | 13.96 | 6.64 | 1.38 |
|  | FR(1, 3) | 255.51 | 128.09 | 25.31 | 12.4 | 2.55 |
| v = 1 | FR(1, 2) | 204.14 | 105.54 | 19.90 | 9.5 | 1.77 |
|  | FR(1, 3) | 377.83 | 191.69 | 37.72 | 18.16 | 3.5 |

Table 1 shows the discrimination ratios defined in Eq. (22) for $C_{rs}(0;0)$, $C_{rs}(0;0.5)$, and $C_{rs}(0;1)$. There appears to be only small variation of the discrimination ratio with varying number of photo-counts. Table 2 shows the Fisher ratio defined in Eq. (23) for $C_{rs}(0;0)$, $C_{rs}(0;0.5)$, and $C_{rs}(0;1)$. Fisher ratio decreases when using a lower number of photo-counts, but for photo-counts greater than one hundred, the Fisher ratios show good separability between the reference and false objects when v=1. Fisher ratios are larger when v=1 than other values since the approximated theoretical value of the variance is proportional to $1/N_P$.

FIGS. 10(a)-12(b) are graphs 260, 270, 280, 290, 300, 310 showing ROC curves corresponding to cars (1,2) and cars (1,3) for $C_{rs}(0;0)$, $C_{rs}(0;0.5)$, and $C_{rs}(0;1)$, respectively. The number of photons varies from 100 to 10.

A photon counting passive 3D sensing for ATR using integral imaging is described. A microlens array generates photon-limited multi-view (elemental) images to discriminate unknown 3D objects. Photon events are modeled with Poisson distribution. The proposed nonlinear correlation of photon-limited images can improve the system performance. The first and second order statistical properties of the nonlinear correlation output are determined. The output of the nonlinear correlation provides better performance than the linear matched filter.

The proposed photon counting passive 3D sensing with integral imaging seems to be robust for pattern recognition. Unknown objects captured by integral imaging may be recognized with a small number of photons.

APPENDIX A

Eq. (18) and (19) are proved as follows:

$$\langle C_{rs}(0;0)\rangle = \frac{1}{A}\sum_{i=1}^{N_T} R(x_i)\langle \hat{S}(x_i)\rangle \approx \frac{1}{A}\sum_{i=1}^{N_T} R(x_i)n_p(x_i) \quad (A1)$$

$$= \frac{N_P}{A}\sum_{i=1}^{N_T} R(x_i)\frac{S(x_i)}{\sum_{j=1}^{N_T} S(x_j)} = \frac{N_P}{A}\sum_{i=1}^{N_T} R(x_i)S(x_i),$$

since $\langle \hat{S}(x_i)\rangle \approx n_p(x_i)$ in Eq. (11) and $$n_p(x_i) = N_P S(x_i) \bigg/ \sum_{j=1}^{N_T} S(x_j) = N_P S(x_i)$$

from Eq. (4) and Eq. (16).

$$\text{var}(C_{rs}(0;0)) = \frac{1}{A^2}\sum_{i=1}^{N_T} R^2(x_i)\text{var}(\hat{S}(x_i)) \quad (A2)$$

$$\approx \frac{1}{A^2}\sum_{i=1}^{N_T}\left\{R^2(x_i)\left[\begin{array}{c}n_p(x_i)-\\ n_p^2(x_i)\end{array}\right]\right\}$$

$$= \frac{N_P}{A^2}\sum_{i=1}^{N_T}\left\{R^2(x_i)\frac{S(x_i)}{\sum_{j=1}^{N_T} S(x_j)}\left[1-N_P\frac{S(x_i)}{\sum_{j=1}^{N_T} S(x_j)}\right]\right\}$$

$$= \frac{N_P}{A^2}\sum_{i=1}^{N_T}\{R^2(x_i)S(x_i)[1-N_P S(x_i)]\},$$

since $\hat{S}(x_1),\ldots,\hat{S}(x_{N_T})$ are assumed to be independent Bernoulli random variables; and $\text{var}(\hat{S}(x_i))=n_p(x_i)-n_p^2(x_i)$.

APPENDIX B

Eq. (20) and (21) are proved by use of the moment generating function. First, it is shown that:

$$C_{rs}(0;1) = \frac{\sum_{i=1}^{N_T} R(x_i)\hat{S}(x_i)}{A\sum_{i=1}^{N_T}\hat{S}(x_i)} = \frac{1}{A}\sum_{i=1}^{N_T}\frac{R(x_i)b_i}{N} = \frac{1}{A}\sum_{i=1}^{N_T}\frac{R(x_i)b_i}{b_i+N_i}, \quad (B1)$$

since $\sum_{i=1}^{N_T}\hat{S}(x_i) = \sum_{i=1}^{N_T} b_i = N$ from Eq. (8) and Eq. (13);

and it is defined that:

$$N_i = N - b_i. \quad (B2)$$

With the assumption of $p_j \ll 1$, the moment generating function of $N_i$ becomes:

$$\Phi_{N_i}(s) = \langle e^{sN_i}\rangle \quad (B3)$$

$$= \prod_{j=1,j\neq i}^{N_T}(p_j e^s + q_j)$$

$$\approx \prod_{j=1,j\neq i}^{N_T} e^{p_j(e^s-1)}$$

$$= e^{\alpha_i(e^s-1)},$$

$$p_j = P(b_j = 1) = 1 - e^{-n_p(x_j)} \approx n_p(x_j) = N_P S(x_j), \quad (B4)$$

$$q_j = P(b_j = 0) = e^{-n_p(x_j)} \approx 1 - n_p(x_j) = 1 - N_P S(x_j), \quad (B5)$$

$$\alpha_i = \sum_{j=1,j\neq i}^{N_T} p_j \approx N_P(1-S(x_i)), \quad (B6)$$

Since $e^{\alpha_i(e^s-1)}$ is the moment generating function of the Poisson distribution, it is assumed the distribution of $N_i$ approximately follows the Poisson distribution with the parameter $\alpha_i$:

$$P(N_i) \approx \frac{\alpha_i^{N_i} e^{-\alpha_i}}{N_i!}, \quad N_i = 0, 1, 2, \ldots \qquad (B7)$$

Next, $$\left\langle \frac{b_i}{b_i + N_i} \right\rangle$$

is derived as follows:
Let $$y_i = \frac{b_i}{b_i + N_i}. \qquad (B8)$$

The moment generating function of $y_i$ is:

$$\Phi_{y_i}(s) = \langle e^{sy_i} \rangle = \sum_{N_i=0}^{\infty} \left( p_i e^{\frac{s}{1+N_i}} + q_i \right) P(N_i). \qquad (B9)$$

Thus, the mean of $y_i$ becomes:

$$\langle y_i \rangle = \Phi'_{y_i}(0) \qquad (B10)$$

$$= \sum_{N_i=0}^{\infty} \frac{p_i e^{\frac{s}{1+N_i}} P(N_i)}{1+N_i} \bigg|_{s=0}$$

$$= \sum_{N_i=0}^{\infty} \frac{p_i P(N_i)}{1+N_i} \approx \sum_{N_i=0}^{\infty} \frac{p_i e^{\alpha_i} (\alpha_i)^{N_i}}{(1+N_i) N_i!}$$

$$= \frac{p_i}{\alpha_i}(1 - e^{-\alpha_i}) \approx \frac{N_P S(x_i)}{N_P(1-S(x_i))}(1-e^{-\alpha_i}) \approx S(x_i).$$

In the above equation:

$$\frac{S(x_i)}{1-S(x_i)} \approx S(x_i), \qquad (B11)$$

and, $$1 - e^{-\alpha_i} \approx 1, \qquad (B12)$$

since $S(x_i) \ll 1$, and $e^{-\alpha_i} \ll 1$.

Therefore, from Eq. (B1) and Eq. (B10), $$\langle C_{rs}(0;1) \rangle = \frac{1}{A}\sum_{i=1}^{N_T} R(x_i)\langle y_i \rangle \approx \frac{1}{A}\sum_{i=1}^{N_T} R(x_i)S(x_i). \qquad (B13)$$

Also, we derive $\text{var}(y_i)$ and $\text{cov}(y_i, y_j)$ as:

$$\text{var}(y_i) = \langle y_i^2 \rangle - \langle y_i \rangle^2, \qquad (B14)$$

and, $$\text{cov}(y_i, y_j) = \langle y_i y_j \rangle - \langle y_i \rangle \langle y_j \rangle. \qquad (B15)$$

$\langle y_i^2 \rangle$ is derived as follows:

$$\langle y_i^2 \rangle = \Phi''_{y_i}(0) \qquad (B16)$$

$$= \sum_{N_i=0}^{\infty} \frac{p_i e^{\frac{s}{1+N_i}} P(N_i)}{(1+N_i)^2} \bigg|_{s=0}$$

$$= \sum_{N_i=0}^{\infty} \frac{p_i P(N_i)}{(1+N_i)^2} \approx \sum_{N_i=0}^{\infty} \frac{p_i e^{-\alpha_i}(\alpha_i)^{N_i}}{N_i!(1+N_i)^2}$$

$$= \sum_{N_i=0}^{\infty} \frac{p_i e^{-\alpha_i}(\alpha_i)^{N_i}(2+N_i)}{(2+N_i)!(1+N_i)} \approx \frac{p_i}{\alpha_i^2}(1 - e^{-\alpha_i} - \alpha_i e^{-\alpha_i}) \approx$$

$$\frac{N_P S(x_i)}{N_P^2(1-S(x_i))^2}(1 - e^{-\alpha_i} - \alpha_i e^{-\alpha_i}) \approx \frac{S(x_i)}{N_P},$$

To derive $\langle y_i y_j \rangle$, $N_{ij}$ is defined as:

$$y_i = \frac{b_i}{b_i + b_j + N_{ij}}, \qquad (B17)$$

$$N_{ij} = N - b_i - b_j. \qquad (B18)$$

where $N_{ij}$ approximately follows the Poisson distribution as $N_i$ in Eq. (B7):

$$P(N_{ij}) \approx \frac{a_{ij}^{N_{ji}} e^{-\alpha_{ji}}}{N_{ij}!}, \quad N_{ij} = 0, 1, 2, \ldots, \qquad (B19)$$

$$a_{ij} = \sum_{k=1, k \neq i, k \neq j}^{N_T} = N_P(1 - S(x_i) - S(x_j)). \qquad (B20)$$

Therefore, the joint moment generating function of $y_i$ and $y_j$ is:

$$\Phi_{y_i y_j}(s_1, s_2) = \langle e^{s_1 y_1 + s_2 y_j} \rangle \qquad (B21)$$

$$= \sum_{N_{ij}=0}^{\infty} \begin{pmatrix} p_i p_j e^{\frac{s_1}{2+N_{ji}} + \frac{s_2}{2+N_{ij}}} + \\ p_i q_j e^{\frac{s_1}{1+N_{ij}}} + \\ q_i p_j e^{\frac{s_2}{1+N_{ij}}} + q_i q_j \end{pmatrix} P(N_{ij})$$

Thus, $$\langle y_i y_j \rangle = \frac{\partial^2 \Phi_{y_i y_j}(s_1, s_2)}{\partial s_1 \partial s_2} \bigg|_{s_1=s_2=0} \qquad (B22)$$

$$= \sum_{N_{ij}=0}^{\infty} \frac{p_i p_j}{(2+N_{ij})^2} P(N_{ij}) \approx \sum_{N_{ij}=0}^{\infty} \frac{p_i p_j e^{-\alpha_{ij}}(\alpha_{ij})^{N_{ij}}}{(2+N_{ij})^2 N_{ij}!}$$

$$= \sum_{N_{ij}=0}^{\infty} \frac{p_i p_j e^{-\alpha_{ij}}(\alpha_{ij})^{N_{ij}}(1+N_{ij})}{(2+N_{ij})!(2+N_{ij})} \approx$$

$$\frac{p_i p_j}{(\alpha_{ij})^2}(1 - e^{-\alpha_{ij}} - \alpha_{ij} e^{-\alpha_{ij}}) \approx$$

$$\frac{N_P^2 S(x_i) S(x_j)}{N_P^2(1 - S(x_i) - S(x_j))^2} \approx S(x_i) S(x_j).$$

Since $\langle y_i \rangle \approx S(x_i)$ in Eq. (B10), $$\text{cov}(y_i, y_j) = \langle y_i y_j \rangle - \langle y_i \rangle \langle y_j \rangle \approx 0. \qquad (B23)$$

Therefore, $$\text{var}(C_{rs}(0;1)) = \frac{1}{A^2}\left[\sum_{i=1}^{N_T} R^2(x_i)\text{var}(y_i) + \sum_{i=1}^{N_T}\sum_{j=1,i\neq j}^{N_T} R(x_i)R(x_j)\text{cov}(y_i, y_j)\right] \approx \qquad (B24)$$

$$\frac{1}{A^2}\sum_{i=1}^{N_T} R^2(x_i)[\langle y_i^2\rangle - \langle y_i\rangle^2] \approx$$

$$\frac{1}{A^2}\left(\frac{1}{N_p}\sum_{i=1}^{N_T} R^2(x_i)S(x_i) - \sum_{i=1}^{N_T} R^2(x_i)S^2(x_i)\right).$$

The system according to at least an embodiment of the present invention provides an advantage of significantly reducing the required number of photons for target recognition. For example, the present system requires fewer than 100 photons to detect and recognize unknown targets. The conventional systems known in the existing art need to record a whole two-dimensional irradiance image composed of 1000× 1000 pixels. The small number of photons required by the present invention results in significant reduction of the system power requirements and also results in significant reduction in computational load. For example, processing of 50-100 pixels according to the present system instead of one million pixels, as on conventional systems, results in a much faster processing time.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system for recognition of a target three-dimensional object, the system comprising:
   a photon-counting detector;
   a three-dimensional integral imaging system positioned between the photon-counting detector and the target three-dimensional object, and structured to generate a photon-limited elemental image of the target three-dimensional object; and
   a signal analyzer structured to correlate the photon-limited elemental images with a reference image and generate a correlation value $C_{rs}(x_j, v)$, wherein v is the power of a photon-limited image intensity, and x is a position vector;
   wherein the correlation value is given by:

$$C_{rs}(x_j; v) = \frac{\sum_{i=1}^{N_T} R(x_i + x_j)\hat{S}(x_i)}{\left(\sum_{i=1}^{N_T} R^2(x_i)\right)^{\frac{1}{2}}\left(\sum_{i=1}^{N_T} \hat{S}(x_i)\right)^v} = \frac{\sum_{k=1}^{N} R(x_k + x_j)}{A\left(\sum_{i=1}^{N_T} \hat{S}(x_i)\right)^v},$$

wherein $A = \left(\sum_{i=1}^{N_T} R^2(x_i)\right)^{\frac{1}{2}}$; and

N is the a total number of photons detected R is a radiance of the reference image, $\hat{S}$ is a photon-limited image, $N_T$ is a total number of pixels, v is the power of a photon-limited image intensity, and x is a position vector.

2. The system of claim 1, wherein the three-dimensional integral imaging system comprises a microlens array comprising a plurality of micro lenses.

3. The system of claim 2, wherein each microlens of the microlens array is structured to generate the photon-limited elemental image of the target three-dimensional object, and the photon-counting detector is structured to sense the photon-limited elemental images.

4. The system of claim 3, further comprising a signal analyzer structured to employ non-linear matched filtering of photon-limited elemental images.

5. The system of claim 1, wherein the signal analyzer is structured to optimize target recognition capability of the system based on at least one of the following metrics: a discrimination ratio DR, a Fisher ratio FR, or receiver operating characteristic curves.

6. The system of claim 5, wherein the discrimination ratio DR is given by $$DR(r, s) \equiv \frac{m_{rr}}{m_{rs}},$$

where $m_{rs}$ and $\sigma_{rs}$ are the sample mean and the sample standard deviation of the correlation value $C_{rs}(x_j, v)$ when $x_j=0$, r is a reference object, and s is the target three-dimensional object; and $m_{rr}$ is the mean of the autocorrelation of the reference object.

7. The system of claim 5, wherein the Fisher ratio FR is given by $$FR(r, s) \equiv \frac{[m_{rr} - m_{rs}]^2}{\sigma_{rr}^2 + \sigma_{rs}^2},$$

where $m_{rs}$ and $\sigma_{rs}$ are the sample mean and the sample standard deviation of the correlation value $C_{rs}(x_j, v)$ when $x_j=0$, r is a reference object, and s is the target three-dimensional object, and $m_{rr}$ and $\sigma_{rr}$ are the mean and standard deviation of the autocorrelation of the reference object.

8. The system of claim 1 wherein the target three-dimensional object comprises a target of military or security interest.

9. The system of claim 1 wherein the target three-dimensional object comprises a target of medical or biological interest.

10. The system of claim 1, wherein the system is structured to operate under conditions of low ambient light.

11. The system of claim 1, wherein the system is structured to identify the target three-dimensional object when the photon-counting detector receives less than 100 photons.

12. A method for recognizing a target three-dimensional object, the method comprising:
    generating a photon limited image of the target three-dimensional object;

recording the photon-limited image with a photon-counting detector;

using the recorded photon-limited image to determine whether the target three-dimensional object matches a reference object by correlating the photon-limited elemental images with a reference image and generating a correlation value $C_{rs}(x_j, v)$;

wherein the correlation value $C_{rs}(x_j, v)$ is defined as:

$$C_{rs}(x_j; v) = \frac{\sum_{i=1}^{N_T} R(x_i + x_j)\hat{S}(x_i)}{\left(\sum_{i=1}^{N_T} R^2(x_i)\right)^{\frac{1}{2}}\left(\sum_{i=1}^{N_T} \hat{S}(x_i)\right)^v} = \frac{\sum_{k=1}^{N} R(x_k + x_j)}{A\left(\sum_{i=1}^{N_T} \hat{S}(x_i)\right)^v},$$

wherein $A = \left(\sum_{i=1}^{N_T} R^2(x_i)\right)^{\frac{1}{2}}$; and

N is the a total number of photons detected, R is a radiance of the reference image, S is a photon-limited image, $N_T$ is a total number of pixels, v is the power of a photon-limited image intensity, and x is a position vector.

13. The method of claim 12, wherein the photon-counting detector records the photon-limited image based on less than 100 photons.

14. The method of claim 12, further comprising optimizing target recognition capability of the system based on at least one of the following metrics: a discrimination ratio DR, a Fisher ratio FR, or receiver operating characteristic curves.

15. The method of claim 14, wherein the discrimination ratio DR is given by $$DR(r, s) \equiv \frac{m_{rr}}{m_{rs}},$$

where $m_{rs}$ and $\sigma_{rs}$ are the sample mean and the sample standard deviation of the correlation value $C_{rs}(x_j, v)$ when $x_j=0$, r is the reference object, and s is the target three-dimensional object and $m_{rr}$ is the mean of the autocorrelation of the reference object.

16. The method of claim 14, wherein the Fisher ratio FR is given by $$FR(r, s) \equiv \frac{[m_{rr} - m_{rs}]^2}{\sigma_{rr}^2 + \sigma_{rs}^2},$$

where $m_{rs}$ and $\sigma_{rs}$ are the sample mean and the sample standard deviation of the correlation value $C_{rs}(x_j, v)$ when $x_j=0$, r is the reference object, and s is the target three-dimensional object and $m_{rr}$ and $\sigma_{rr}$ are the mean and standard deviation of the autocorrelation of the reference object.

17. A system for recognition of a target three-dimensional object, the system comprising:

at least one photon-counting detector; and a three-dimensional integral imaging system positioned between the photon-counting detector and the target three-dimensional object;

wherein a mean of photon-counts $n_p(x)$ for a photon-counting detector of the at least one photon-counting detector, centered on a position vector x, for all x, during a time interval τ, satisfies the following relationship:

$$n_p(x) = \frac{\eta E(x)}{h\bar{v}}\tau \ll 1,$$

wherein η is a quantum efficiency of the detection process, E(x) is a power incident on the photon-counting detector centered on a position vector x, h is Plank's constant, and $\bar{v}$ is a mean frequency of a quasi-monochromatic light source.

18. A method for recognizing a target three-dimensional object, the method comprising:

generating a photon limited image of the target three-dimensional object;

recording the photon-limited image with at least one photon-counting detector; and using the recorded photon-limited image to determine whether the target three-dimensional object matches a reference object; and wherein a mean of photon-counts $n_p(x)$ for a photon-counting detector of the at least one photon-counting detector, centered on a position vector x, for all x, during a time interval τ, satisfies the following relationship:

$$n_p(x) = \frac{\eta E(x)}{h\bar{v}}\tau \ll 1,$$

wherein η is a quantum efficiency of the detection process, E(x) is a power incident on the photon-counting detector centered on a position vector x, h is Plank's constant, and $\bar{v}$ is a mean frequency of a quasi-monochromatic light source.

\* \* \* \* \*